(12) United States Patent  (10) Patent No.: US 6,201,471 B1
Jones  (45) Date of Patent: Mar. 13, 2001

(54) MODULAR CENTER STACK CONSOLE

(75) Inventor: Randall T. Jones, Shaker Hts, OH (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/122,153

(22) Filed: Jul. 24, 1998

(51) Int. Cl.⁷ .................................................... B60Q 1/00
(52) U.S. Cl. .............................................. 340/461; 701/36
(58) Field of Search ....................... 340/461; 701/36–48, 701/49; 307/10.1, 9.1

(56) References Cited

U.S. PATENT DOCUMENTS 5,916,288 * 6/1999 Hartman ................................. 701/36

* cited by examiner

*Primary Examiner*—Daryl Pope
(74) *Attorney, Agent, or Firm*—Richard A. Jones

(57) ABSTRACT

A single modular unit having a single display and several dual function potentiometers for controlling various functions of a radio and an HVAC climate control system. More real estate is made available in the instrument panels trim and dashboard for other components such as a refrigerated compartment, navigation system display units, cellular phone compartments and so forth where prior art HVAC switches were located. Further, a single modular system incorporating controls for the radio and the HVAC simplifies the vehicle assembly process in that a single unit can be shipped to and installed into the vehicle instead of two separate units.

4 Claims, 1 Drawing Sheet

MODULAR CENTER STACK CONSOLE

TECHNICAL FIELD

This invention relates to a single modular console having a plurality of potentiometers for adjusting the radio and the heating, ventilation and air conditioning (hereafter HVAC) features in a vehicle.

BACKGROUND OF THE INVENTION

To date, the radio is a single display component usually controlled by at least four potentiometers. The HVAC system is a single display component controlled by at least three potentiometers and several buttons. Both of these components are shipped to a vehicle plant in separate containers and are installed into the vehicle at different times. This is labor intensive, costly and consumes a substantial amount of real estate on the surface of and behind the dashboard of the vehicle.

The present invention provides advantages over and alternatives to the prior art.

SUMMARY OF THE INVENTION

The present invention incorporates the function of the upper level radio with an HVAC climate control. The present invention includes a single modular unit having a single display and several dual function potentiometers for controlling various functions of a radio and an HVAC climate control system. The present invention makes more real estate available in the instrument panels trim and dashboard for other components such as a refrigerated compartment, navigation system display units, cellular phone compartments and so forth where prior art HVAC switches were located. Further, a single modular system incorporating controls for the radio and the HVAC simplifies the vehicle assembly process in that a single unit can be shipped to and installed into the vehicle instead of two separate units.

In a preferred embodiment, the single modular unit utilizes three dual function potentiometers. The radio tuning function uses one dual function potentiometer and a second dual function potentiometer is provided to control other features and functions of the radio. The HVAC system also has a dual function potentiometer. Preferably the potentiometer includes a two-piece knob assembly having an outside piece that rotates around an inside piece that functions as a push button switch.

These and other objects, features and advantages of the present invention will become apparent from the following brief description of the drawing, detailed description, and appended claims and drawing.

BRIEF DESCRIPTION OF THE DRAWING

The FIGURE illustrates a single modular console unit including a single display, several dual function potentiometers for adjusting and controlling the radio and the HVAC system.

DESCRIPTION OF THE PREFERRED EMBODIMENT

Figure 1:
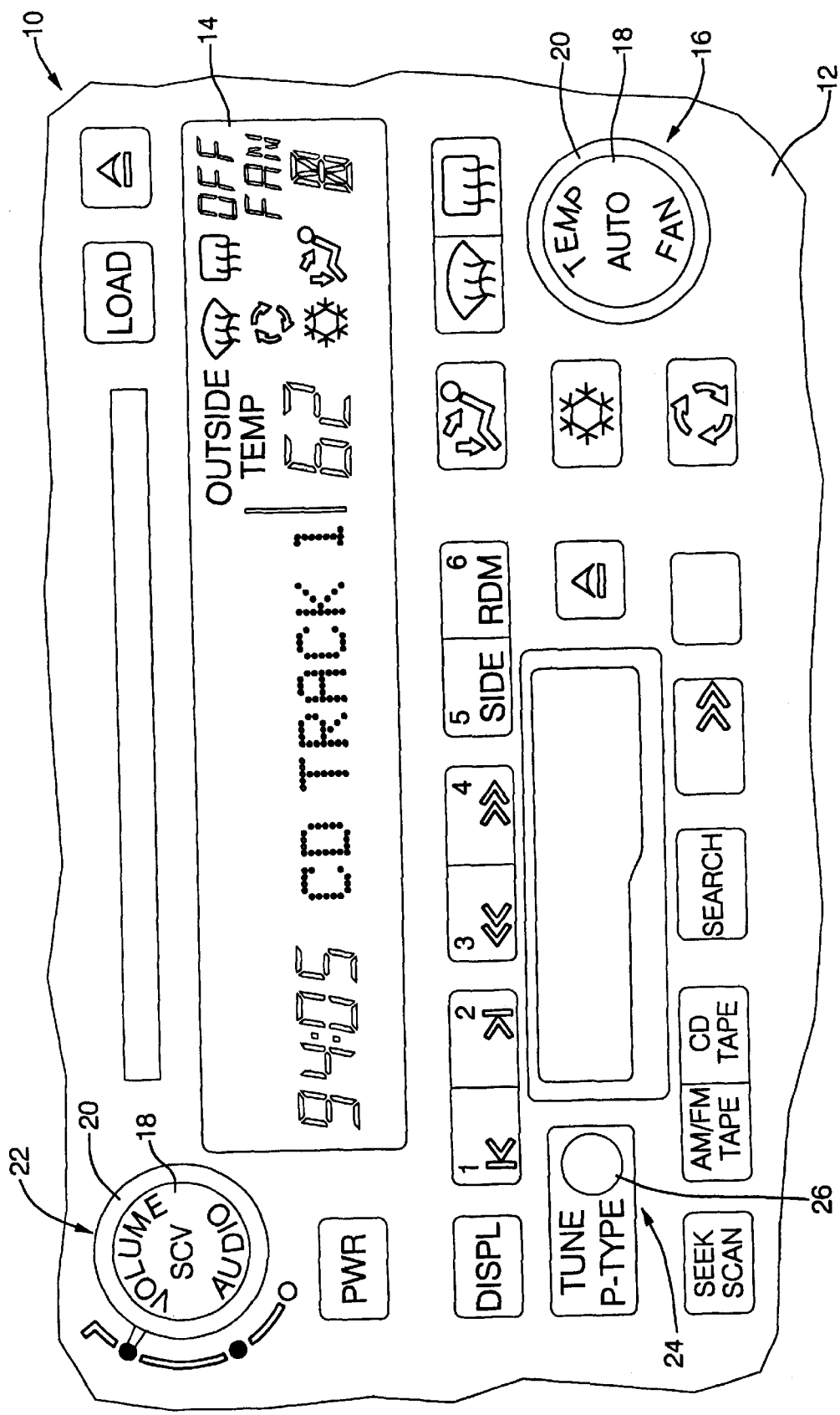

FIG. 1 illustrates a single modular console unit having a plurality of potentiometers for controlling the radio and HVAC climate control systems. The unit 10 includes a face plate 12 mounted on a housing of a radio (not shown). The face plate 12 includes a plurality of openings for a variety of buttons, displays and potentiometers that extend therethrough. However, according to the present invention a single display 14 is utilized to electronically display information regarding various functions and features of the radio and the HVAC climate control system. For example, the same display window 14 may be utilized to electronically provide information regarding the radio frequency, cassette or CD track information, as well as climate control information such as inside and outside temperatures, the speed of the blower fan, mode control icons designating operation of the heater, air conditioner, windshield or rear window defrost, bidirectional venting and so forth.

In the preferred embodiment, the modular unit uses only three dual function potentiometers. The radio tuning functional uses one dual function potentiometer. The HVAC and radio systems will use one dual function potentiometer respectively. The preferred potentiometer includes a two-piece knob assembly. The assembly includes a push button inside portion 18 which may be depressed to cycle through a variety of control feature options. In this case the push button portion 18 provides a momentary contact switch function which the electronics can recognize thus activating the toggle sequence. A rotary portion 20 is provided to adjust the selected control feature to a desired setting. The unit includes a first potentiometer 16 that cooperates with HVAC electronics that are designed to read input from the push button inside portion 18 of potentiometer to toggle between areas control features such as a temperature, fan speed, auto climate (that maintains the passenger compartment at a set temperature), and on/off, and then read input from the rotary outside portion 20 to adjust each control feature as desired. Electronics may be designed so that when the rotary portion 20 has been moved to a desired location and maintained for five seconds the setting is stored in the memory of the electronics. The standard default of the HVAC potentiometer is the temperature control feature. Once the function (push button portion of the potentiometer) is toggle to either fan speed or climate control and an adjustment is made using rotary portion, the electronics will automatically toggle the function of the potentiometer back to the default function (temperature control) after five seconds of no input.

The unit includes a second potentiometer 22 that cooperates with the radio electronics that are designed to read input from the push button inside portion 18 of the potentiometer to toggle between various control features such as volume, audio control (to adjust bass, treble, balance and fade features), speed compensated volume (which increases or decreases the volume with the speed of the vehicle) and then to read input from the rotary portion 20 to adjust these various functions to desired levels in a manner as described above with respect to the HVAC controls. The standard default of the radio potentiometer is volume. Once the function is toggle to either audio control or speed compensated volume and an adjustment is made using the rotary portion of a potentiometer, the electronics will automatically toggle the function of the potentiometer back to the default function (volume) after five seconds of no input.

The third potentiometer 24 controls the tuning of the radio frequencies. This is accomplished by pushing a button 26 of the potentiometer and rotating the shaft as desired to locate the desired radio station by frequency. The button 26 can also be pushed a second time to activate a radio search feature which searches for radio stations in a local area by a particular music category such as country, jazz, rock and and so forth. The radio stations transmit a signal during their broadcast to identify the music category of the station which can be recognized by the electronics of the radio system.

Systems having dual function potentiometers with switching capabilities and associated electronics are known to those skilled in the art. Examples of such systems are disclosed in U.S. Pat. No. 5,084,692 issued Jan. 28, 1992 and U.S. Pat. No. 5,430,249 issued Jul. 4, 1995, the disclosures of which are hereby incorporated by reference.

What is claimed is:

1. A product comprising:

a single modular console unit for installing in a vehicle, the unit including three dual function potentiometers, the first dual function potentiometer for controlling the HVAC system of the vehicle wherein the first dual function potentiometer includes a push button inside portion which may be depressed to toggle between various HVAC control features and a rotary outside portion to adjust the settings for the HVAC features, the second dual function potentiometer for controlling various radio functions and having a push button inside portion that may be depressed to toggle between various radio control functions and a rotary outside portion to adjust each radio function as desired, and the third dual function potentiometer for selecting various radio frequencies and having a push button and a rotatable shaft wherein the button that may be depressed a first time to activate a radio frequency tuning feature and so that the frequency may be adjusted by rotating the shaft and wherein the push button may be depressed a second time to activate a radio frequency search function which searches for radio stations based on the type of programming format, and wherein the shaft may be rotated to toggle between various radio programming formats.

2. A product as set forth in claim 1 wherein the unit does not include any other potentiometers to adjust or control the radio or the HVAC system.

3. A product as set forth in claim 1 wherein the unit has one electronic display for displaying information regarding both radio and HVAC functions, settings or features.

4. A product comprising:

a single modular console unit for installing in a vehicle, the unit including a first dual function potentiometer for controlling the HVAC system of the vehicle wherein the first dual function potentiometer includes a push button inside portion which may be depressed to toggle between various HVAC control features and a rotary outside portion to adjust the settings for the HVAC features, and a second dual function potentiometer to control various radio functions wherein the second dual function potentiometer includes a push button inside portion that may be depressed to toggle between various radio control functions and a rotary outside portion to adjust each radio function as desired.

* * * * *